US008536262B2

(12) United States Patent
Schweitzer et al.

(10) Patent No.: US 8,536,262 B2
(45) Date of Patent: Sep. 17, 2013

(54) TIRE TREAD BASE CONTAINING SYNDIOTACTIC-1,2-POLYBUTADIENE WITH DIVERSE CARBON BLACKS

(75) Inventors: Claude Schweitzer, Colmar-Berg (LU); Junling Zhao, Hudson, OH (US); Marc Weydert, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 50 days.

(21) Appl. No.: 13/331,515

(22) Filed: Dec. 20, 2011

(65) Prior Publication Data

US 2013/0153099 A1     Jun. 20, 2013

(51) Int. Cl.
C08K 3/04       (2006.01)
B60C 11/00      (2006.01)

(52) U.S. Cl.
USPC ........................................ 524/495; 152/209.1

(58) Field of Classification Search
USPC .......................................................... 524/495
See application file for complete search history.

(56) References Cited

U.S. PATENT DOCUMENTS

| | | | |
|---|---|---|---|
| 3,901,868 A | 8/1975 | Ueno et al. | 260/94.3 |
| 4,506,031 A | 3/1985 | Henderson et al. | 502/162 |
| 5,307,850 A | 5/1994 | Halasa et al. | 152/209 R |
| 5,430,087 A * | 7/1995 | Carlson et al. | 524/496 |
| 5,798,405 A | 8/1998 | Zimmer et al. | 524/496 |
| 6,956,093 B1 | 10/2005 | Hus et al. | 526/335 |
| 7,337,815 B2 | 3/2008 | Spadone et al. | 152/209.1 |

FOREIGN PATENT DOCUMENTS

| | | |
|---|---|---|
| EP | 0609499 | 8/1994 |
| EP | 1557294 | 7/2005 |
| EP | 1767570 | 3/2007 |

OTHER PUBLICATIONS

J.R. White, S.K. De, Rubber Technologist's Handbook, 2001, Rapra Technology Limited, 142.*
"Characteristic Features of the Rheological Properties of Styrene-Butadiene Based Rubber Compounds Filled with Two Types of Carbon Black", Kautschuk Und Gummi—Kunststoffe, Huthig Verlag, Heidelberg, Germany, vol. 37, No. 6, Jun. 1, 1984, Dschagarowa et al.
European Search Report received by Applicants May 10, 2013.

* cited by examiner

Primary Examiner — Hui Chin
(74) Attorney, Agent, or Firm — Henry C. Young, Jr.

(57) ABSTRACT

The invention relates to a pneumatic tire having a cap/base configuration comprised of an outer tread cap rubber layer, with a tread running surface, and an underlying tread base rubber layer, where the base rubber layer contains syndiotactic polybutadiene with a diverse blend of carbon blacks.

6 Claims, No Drawings

TIRE TREAD BASE CONTAINING SYNDIOTACTIC-1,2-POLYBUTADIENE WITH DIVERSE CARBON BLACKS

FIELD OF THE INVENTION

The invention relates to a pneumatic tire having a cap/base configuration comprised of an outer tread cap rubber layer, with a tread running surface, and an underlying tread base rubber layer, where the base rubber layer contains syndiotactic polybutadiene with a diverse blend of carbon blacks.

BACKGROUND OF THE INVENTION

Pneumatic tires are often provided with a circumferential tread of a cap/base configuration comprised of an outer ground-contacting tread cap rubber layer with a tread running surface and an internal rubber layer underlying said tread cap rubber layer. Such tire constructions are well known to those having skill in such art.

The outer tread cap rubber layer is typically comprised of a rubber composition which provides resistance to tread wear during tire service, stiffness for tire handling purposes and traction for the road surface. Such typically desirable properties are well known to those having skill in such art.

The internal tread underlying rubber layer is typically comprised of a rubber composition which is less stiff than the outer tread cap rubber layer and less hysteretic to promote a reduced internal heat buildup during tire service to thereby provide a transition zone between the outer tread cap rubber layer and the tire carcass. Such typically desirable properties for a tire underlying rubber layer are well known to those having skill in such art.

However, some tires are intended to be provided for use as high performance tires which are expected to provide a challenge of handling and cornering ability. For this invention it is desired to increase the underlying tread rubber layer's stiffness to promote tire handling yet substantially maintain, without significantly increasing, the rubber's hysteresis property, or tendency of internal heat buildup during the tire's service.

While it is well known that a rubber composition's stiffness can normally be increased by increasing its reinforcing filler content, for example by increasing its rubber reinforcing carbon black content, it is also known that such methodology of increasing rubber stiffness through increased reinforcing filler can also be expected to adversely increase the rubber composition's hysteresis and thereby increase its internal heat buildup during tire service accompanied by a usually unwanted extent of temperature increase.

A challenge is then presented for providing a combination of both stiffness and acceptable hysteresis for the rubber composition of the underlying tread rubber layer.

A proposed response to such challenge is to provide an inclusion of syndiotactic-1,2-polybutdiene in the underlying tread rubber composition to increase the stiffness of the rubber composition.

However, it is envisioned that such inclusion of syndiotactic polybutadiene to increase the rubber stiffness would also promote increase the rubber's hysteresis property (increase its rebound property) and therefore promote increasing its internal heat build-up during service of the tire.

Accordingly, it is desired to increase the rubber stiffness by the inclusion of the syndiotactic polybutadiene while substantially maintaining the hysteresis property of the rubber composition (as evidenced by its rebound value) to therefore substantially maintain a consistent resistance to internal heat buildup during service of the tire.

Stiffness of the rubber composition promoted by the inclusion of the inclusion of the syndiotactic-1,2-polybutadiene which may, however tend to reduce the hysteresis of the rubber composition and thereby promote an increase in internal heat build-up. To counteract such phenomenon it is proposed to evaluate use of a diverse combination of carbon blacks.

Historically, syndiotactic polybutadiene has been used in various rubber compositions for various tire components for various purposes such as, for example, tire carcass and innerliner components. For example, see U.S. Pat. Nos. 5,307,850 and 6,956,093.

For such evaluation it is envisioned that such diverse combination of carbon blacks may comprise a combination of a relatively high rubber reinforcing rubber reinforcing carbon black with a high surface area (e.g. Iodine absorption value of at least 100 g/kg (ASTM D1510), to promote both rubber reinforcement and electrical conductivity for the syndiotactic polybutadiene-containing rubber combined with a significantly lower rubber reinforcing rubber reinforcing carbon black with a significantly lower surface area (e.g. Iodine absorption value of less than 50 g/kg) composition which would be expected to provide a combination of reduced rubber reinforcement and reduced electrical conductivity for the rubber composition.

In such manner, then the inclusion of the lower rubber reinforcing (lower surface area) carbon black would beneficially promote a reduction in hysteresis, and therefore a desirably reduced internal heat build up in the rubber composition, although with a reduction in reinforcing effect for the rubber composition and the inclusion of the higher rubber reinforcing (higher surface area) carbon black would beneficially promote a sufficient reinforcing effect for the rubber composition.

Representative of such high rubber reinforcing carbon black for purposes of this invention are rubber reinforcing carbon blacks which have an Iodine absorption value in a range of from about 100 to about 300 g/kg. Representative of such carbon blacks are, for example, according to their ASTM designations, N110, N121, N134, N220, N233, N234, N242, and N293.

Representative of such lower rubber reinforcing carbon black for purposes of this invention are rubber reinforcing carbon blacks which have an Iodine absorption value in a range of from about 10 to about 50, alternately about 25 to about 50, g/kg. Representative of such carbon blacks are, for example, according to their ASTM designations, N539, N550, N582, N630, N642, N650, N660, N683, N754, N762, N765, N774 and N787 and, also, N907, N907, N990 and N991.

Therefore, it is envisioned that a major portion of the diverse combination of rubber reinforcing carbon blacks will be comprised of at least one of said lower rubber reinforcing carbon blacks (lower surface rubber reinforcing carbon blacks).

It is believed that use of syndiotactic polybutadiene for a tread base rubber composition combined with such aforesaid combination of diverse rubber reinforcing carbon blacks is novel and a departure from past practice and that such combination is warranted for evaluation.

In the description of this invention, the term "phr" where used means "parts of material by weight per 100 parts by weight of rubber". The terms "rubber" and "elastomer" may be used interchangeably unless otherwise indicated. The terms "rubber composition" and "compound" may be used interchangeably unless otherwise indicated.

A volume electrical resistivity, which might sometimes referred to herein as electrical resistivity, may suitably be determined by DIN 53682 or ASTM Method D257-92 and reported herein as ohm-cm.

Dibutylthphalate (DBP) absorption values for carbon blacks is expressed in terms of cc/100 grams according to ASTM D2414. Nitrogen surface area (NSA) value, where referenced, is expressed in terms of square meters per gram ($m^2/g$) according to ASTM D3037.

SUMMARY AND PRACTICE OF THE INVENTION

In accordance with this invention, a pneumatic rubber tire is provided having a circumferential tread of a cap/base configuration comprised of an outer tread cap rubber layer (having a tread running surface) and an internal tread rubber layer (e.g. tread base rubber layer or intermediate rubber layer between said outer tread cap rubber layer and tread base rubber layer) underlying said outer tread cap rubber layer, wherein said internal tread rubber layer rubber composition is comprised of, based upon parts by weight per 100 parts by weight rubber (phr):

(A) rubber(s) comprised of:
  (1) about 2 to about 100, alternately from about 2 to about 60, and alternately from about 2 to about 8, phr of syndiotactic-1,2-polybutadiene, and
  (2) from zero to about 98, alternately from 40 to about 98 and alternately from about 92 to about 98, phr of at least one additional diene-based elastomer comprised of at least one of polymers and copolymers of at least one of isoprene and 1,3-butadiene and copolymers of styrene and at least one of isoprene and 1,3-butadiene, (B) from about 20 to about 70, alternately from about 25 to about 50 phr of rubber reinforcing carbon blacks comprised of:
  (1) about 10 to about 40, alternately from about 10 to about 30, phr of a first rubber reinforcing carbon black having an Iodine absorption value (ASTM D2515) in a range of from about 6 to about 50, alternately from about 20 to about 50, g/kg and a dibutylthalate (DBP) absorption value (ASTM D2414) in a range of from about 30 to about 200, alternately from about 60 to about 150, cc/100 g,
  (2) about 10 to about 40, alternately from about 10 to about 30, phr of a second rubber reinforcing carbon black having an Iodine absorption value (ASTM D2515) in a range of from about 100 to about 1000, alternately from about 100 to about 300, g/kg (ASTM D2515) and a dibutylthalate (DBP) absorption value (ASTM D2414) in a range of from about 95 to about 135 cc/100 g.

In one embodiment, the weight ratio of said first carbon black to said second carbon black is in a range of from 1.1/1 to about 4/1, alternately in a range of from about 1.8/1 to about 4/1.

Reference to rubber reinforcing carbon blacks may be found, for example, as being listed in *The Vanderbilt Rubber Handbook* (1978), Page 417, according to their ASTM designations and associated Iodine values and DBP values.

In one embodiment, if desired, the rubber composition may also contain what may generally be referred to as being electrically conductive carbon blacks.

Representative of carbon blacks that are sometimes referred to as being electrically conductive carbon blacks are, for example, Sidcon™ 159 from Sid Richardson Corporation, Printex XE2-B™ and Corex XE™ from Orion Engineered Carbons understood to have nitrogen surface area of about 560 $m^2/g$ and DPB value of about 400 ml/100 g, Black Pearls 2000™ and Vulcan XC 72™ from Cabot Corporation, understood to have a Iodine number (value) of about 253 $m^2/g$ and DBP value of about 254 ml/100 g; 23MM™ from the 3M Company understood to have a nitrogen surface area of about 558 $m^2/g$ and a DBP value of about 300 ml/100 g; and Ketchen Blacks as EC300J™, EC600J™, and EC600JD™ understood to have nitrogen surface areas of about 1040, 800 and 1000 $m^2/100$ g, respectively and DBP values of about 550, 360 and 500 ml/g, respectively.

The aforesaid electrically conductive carbon blacks differ significantly from the more ordinary rubber reinforcing carbon blacks.

In practice, the syndiotactic-1,2-polybutadiene may have a melting point (MP), for example, in a range of from about 80° C. to about 230° C., alternately in a range from about 100° C. to about 170° C. or from about 130° C. to about 140° C. which is desirably lower than the mixing temperature for the rubber composition which may, for example, be in a range of from about 150° C. to about 180° C. Such polymer melting point (MP) may be determined, for example, as minimum endotherm values from differential scanning calorimetry (DSC) curves as conventionally used and understood by those having skill in such art.

The syndiotactic-1,2-polybutadiene (SPBD) for the purposes of this invention has at least 70 percent, and usually at least about 90 percent, of its monomeric units in a syndiotactic-1,2-configuration. The SPBD might be prepared, for example, in an inert organic solvent such as, for example, utilizing a procedure described in U.S. Pat. No. 3,901,868 or in an aqueous medium utilizing a process described in U.S. Pat. No. 4,506,031 and such patents are incorporated herein in their entirely as a reference for such SPBD methods of preparation.

In practice, the SPBD may be used powder form, or it might be pre-mixed with an elastomer as a masterbatch which is then blended with the rubber composition. In other words, for example, the SPBD may be in a form of a powder at the time that it is mixed with the rubber composition or may be introduced as a pre-formed masterbatch. The SPBD powder may, for example, have a particle size of less than about 60 mesh (less than about 250 microns), alternately less than about 140 mesh (less than 105 microns).

For example, the syndiotactic-1,2-polybutadiene may provided as a pre-formed masterbatch of polybutadiene rubber (e.g. cis 1,4-polybutadiene rubber) containing from about 8 to about 20 weight percent of said syndiotactic-1,2-polybutadiene.

The SPBD powder may be mixed with the rubber composition at a mixing temperature of the rubber composition, for example, which is at least as high as the melting point of the SPBD being used, or alternatively, at a rubber mixing temperature which is lower than the melting of the SPBD being used. During the mixing process, the mixing of the SPBD with the rubber composition is typically carried out in an internal rubber mixer, on a mill mixer, or in some other suitable type of mixing device.

Representative of various additional elastomers for use with the syndiotactic polybutadiene are, for example, cis 1,4-polyisoprene, polybutadiene, including cis 1,4-polybutadiene, styrene/butadiene and styrene/isoprene/butadiene elastomers. In one embodiment, said cis 1,4-polybutadiene is not coupled (e.g. not tin or silicon coupled) or functionalized (e.g. does not contain terminal or in-chain functionalization).

Other conventional compounding ingredients may also, of course, be included in the rubber composition including, for example, zinc oxide, zinc stearate, various processing aids as well as sulfur or sulfur containing compounds together with one or more sulfur cure accelerators.

The following Examples are provided to illustrate the invention and is not intended limit the scope in which it can be practiced. Unless otherwise indicated, parts and percentages are by weight.

EXAMPLE I

Rubber samples were prepared to evaluate use of syndiotactic-1,2-polybutadiene in rubber compositions for promoting stiffness for a rubber composition together with rubber reinforcing carbon blacks, particularly a blend of diverse rubber reinforcing carbon blacks.

For this Example, the syndiotactic-1,2-polybutadiene is provided as a pre-formed masterbatch of cis 1,4-polybutadiene rubber containing about 12 weight percent of said syndiotactic-1,2-polybutadiene.

The basic rubber composition (amounts rounded) for this Example is reported in the following Table 1 with parts and percentages, where appropriate, by weight unless otherwise indicated.

TABLE 1

| Compound | Parts (phr) |
| --- | --- |
| Non-Productive Mixing (NP) | |
| Natural cis 1,4-polyisoprene rubber | 65 |
| Cis 1,4-polybutadiene rubber A[1] | 0, 35 |
| Syndiotactic-1,2-polybutadiene rubber pre-formed masterbatch[2] (4.2 phr of syndiotactic polybutadiene with 30.8 phr of cis 1,4-polybutadiene) | 0, 35 |
| Rubber reinforcing carbon black (A) (N347)[3] | 0, 45 |
| Rubber reinforcing carbon black (B) (N220)[4] | 30, 35, 40 |
| Rubber reinforcing carbon black (C) (N550)[5] | 0, 10, 15 |
| Zinc Oxide | 2.5 |
| Fatty acid[6] | 1.5 |
| Antioxidant(s) | 3.8 |
| Wax, microcrystalline | 1.5 |
| Tackifier resin | 2 |
| Productive Mixing (P) | |
| Sulfur | 2 |
| Sulfur cure accelerator(s)[7] | 2 |
| Sulfur cure retarder[8] | 0.2 |

[1]Cis 1,4-polybutadiene, unmodified in a sense of not being coupled (e.g. not tin or silicon coupled) or functionalized (e.g. not functionalized with terminal or in-chain functional groups) as BUD 1207 ™ from The Goodyear Tire & Rubber Company
[2]Composite of cis 1,4-polybutadiene and syndiotactic-1,2-polybutadiene having a melting point of about 200° C., containing 12 percent of said syndiotactic-1,2-polybutadiene, as VCR412 ™ from UBE
[3]Rubber reinforcing carbon black as N347, an ASTM designation, reportedly having an Iodine absorption value (ASTM D1510) of about 90 g/kg and a DBP absorption value (ASTM D2414) of about 124 cc/100 g.
[4]Carbon black as N220, an ASTM designation, reportedly having an Iodine absorption value (ASTM D1510) of about 121 g/kg and DBP (dibutylphthalate) absorption value (ASTM D2414) of about 114 cc/100 g.
[5]Carbon black as N550, an ASTM designation, reportedly having an Iodine absorption value (ASTM D1510) of about 43 g/kg and DBP (dibutylphthalate) absorption value (ASTM D2414) of about 121 cc/100 g.
[6]Fatty acid comprised primarily of stearic, palmitic and oleic acids
[7]Sulfur cure accelerator as N-tertbutyl-2benzothiazolesulfenamide
[8]Sulfur cure retarder as N-Cyclohexylthiophthalimide For this evaluation, rubber Samples A through E were evaluated.

Control rubber Sample A was prepared with its elastomer components being a combination of natural rubber and cis1,4-polybutadiene rubber without the syndiotactic polybutadiene and rubber reinforcing carbon black as N347.

Rubber Sample B was prepared with its elastomer components being a combination of natural rubber and said pre-formed syndiotactic polybutadiene masterbatch plus rubber reinforcing carbon black as N347.

Experimental rubber Sample C was prepared with their elastomer components being a combination of natural rubber and said pre-formed syndiotactic-1,2-polybutadiene masterbatch plus rubber reinforcing carbon black as N220.

Experimental rubber Samples D and E were prepared with their elastomer components being a combination of natural rubber and said pre-formed syndiotactic-1,2-polybutadiene masterbatch plus a combination of diverse rubber reinforcing carbon blacks as N220 in amounts of 35 and 30, respectively, and rubber reinforcing carbon black N550 in amounts of 10 and 15 phr, respectively.

The rubber compositions were prepared by blending the ingredients in an internal rubber mixer in a series of sequential mixing steps while sheeting out the rubber mixtures and cooling to a temperature below 40° C. between mixing steps. The sequential mixing steps were comprised of a non-productive mixing step(s), (NP), followed by a productive mixing step (P), (in which sulfur and sulfur cure accelerators and optionally retarder were added).

Such sequential mixing steps are well known to those having skill in such art.

The following Table 2 reports cure behavior and various physical properties of rubber Samples A through E based upon the formulation of Table 1. The rubber samples were sulfur cured, where appropriate, for about 11 minutes at about 170° C.

TABLE 2

| | Parts (phr) | | | | |
| --- | --- | --- | --- | --- | --- |
| | Controls | | Exp'l Rubber Samples | | |
| | A | B | C | D | E |
| Elastomers | | | | | |
| Natural cis 1,4-polyisoprene rubber | 65 | 65 | 65 | 65 | 65 |
| Synthetic cis 1,4-polybutadiene rubber | 35 | 0 | 0 | 0 | 0 |
| Syndiotactic-1,2-polybutadiene rubber masterbatch | 0 | 35 | 35 | 35 | 35 |
| Syndiotactic polybutadiene rubber in the masterbatch | 0 | 4.2 | 4.2 | 4.2 | 4.2 |
| Carbon black (A), (N347) | 45 | 45 | 0 | 0 | 0 |
| Carbon black (B), (N220) | 0 | 0 | 40 | 35 | 30 |
| Carbon black (C), (N550) | 0 | 0 | 0 | 10 | 15 |
| Properties | | | | | |
| ATS (11 minutes at 170° C.)[1] | | | | | |
| Tensile strength (MPa) | 18.3 | 16.7 | 19.3 | 18.7 | 19.1 |
| Elongation at break (%) | 447 | 372 | 490 | 449 | 458 |
| Modulus (ring) | | | | | |
| 200%, (MPa) | 6.1 | 8 | 5.9 | 6.9 | 7 |
| 300% (MPa) | 11.9 | 14.3 | 11 | 12.5 | 12.5 |
| Hardness (Shore A), _23° C. | 63.4 | 68 | 64.5 | 66.8 | 66.1 |
| Rebound, Zwick (%) 100° C. | 70 | 70 | 69 | 70 | 71 |
| RPA, 100OC, 1 Hertz[6] | | | | | |
| Storage modulus (G'), 1% strain, MPa | 1.88 | 1.88 | 1.93 | 2.08 | 1.89 |
| Storage modulus (G'), 10% strain, MPa | 1.29 | 1.42 | 1.3 | 1.42 | 1.37 |
| Tan delta, 10% strain | 0.10 | 0.08 | 0.10 | 0.10 | 0.09 |
| Volume Electrical Resistivity (ohm-cm)[3] | 4368 | 3025 | 608 | 772 | 995 |

[1]Data by Automated Testing System instrument (ATS) of the Instron Corporation
[2]Dynamic Mechanical Analysis (DMA) according to ASTM D5992
[3]Volume resistivity (ohm/cm) as a measure of electrical resistivity and considered herein to be a measure of electrical resistance of a rubber composition according to ASTM D257

From Table 2 it is observed that the combination of the syndiotactic-1,2-polybutadiene rubber with the combination of N220 and N550 rubber reinforcing carbon black provided rubber Samples D and E with substantially the same rebound (100° C.) values, namely about the same hysteresis values, of 70 and 71, respectively, as Control rubber Sample A without the syndiotactic polybutadiene with its rebound value (100° C.) of 70.

It is also observed that the combination of the syndiotactic-1,2-polybutadiene rubber with the combination of N220 and N550 diverse rubber reinforcing carbon blacks provided rubber Samples D and E with higher Shore A hardness values of 66.8 and 66.1, respectively, compared to the Shore A hardness of 63.4 of Control rubber Sample A without the syndiotactic-1,2-polybutadiene while maintaining a similar, or same, hysteresis as indicated by a rebound value (100° C.) of about 70.

This is considered as being significant in a sense that such an improvement of compound properties is generally associated with an improvement of tire cornering stiffness and/or tire durability at constant rolling resistance and this was accomplished while maintaining its hysteresis value which is considered to be a significant discovery.

From Table 2 it can also be observed that the combination of syndiotactic-1,2-polybutadiene rubber with the combination of N220 and N550 diverse rubber reinforcing carbon blacks provided a beneficially lower volume electrical resistivity than rubber Samples A, (without the syndiotactic-1,2-polybutadiene), and B and C (without the diverse carbon blacks).

This is considered as being a significant discovery in a sense that the above mentioned benefit of syntiotactic-1,2-polybutadiene combined with the combination of diverse rubber reinforcing carbon blacks was achieved with an added beneficial lower volume electrical resistivity.

It can be concluded that it was discovered that that use of the syndiotactic-1,2-polybutadiene rubber together with the combination of N220 and N550 diverse rubber reinforcing carbon blacks can improve one or more physical properties such Shore A hardness, tensile strength, where electrical conductivity may also be benefited, while maintaining hysteresis property of the rubber composition.

EXAMPLE II

Rubber samples were prepared to evaluate use of syndiotactic-1,2-polybutadiene in rubber compositions for promoting stiffness for a rubber composition together with rubber reinforcing carbon blacks, particularly a blend of diverse rubber reinforcing carbon blacks.

For this Example, the syndiotactic-1,2-polybutadiene was also provided as pre-formed masterbatches of cis 1,4-polybutadiene containing the syndiotactic-1,2-polybutadiene.

The basic rubber composition (amounts rounded) for this Example is reported in the following Table 3 with parts and percentages, where appropriate, by weight unless otherwise indicated.

TABLE 3

| Compound | Parts (phr) |
|---|---|
| Non-Productive Mixing (NP) | |
| Natural cis 1,4-polyisoprene rubber | 35 |
| Cis 1,4-polybutadiene rubber A[1] | 30 |
| Cis 1,4-polybutadiene rubber B[2] | 0, 30.8, 29.05 |
| Syndiotactic-1,2-polybutadiene as a pre-formed masterbatch in cis 1,4-polybutadiene rubber[3] | 0, 35 |
| Syndiotactic polybutadiene in the masterbatch | 0, 4.2, 5.95 |
| Rubber reinforcing carbon black (B) (N134)[4] | 30 |
| Rubber reinforcing carbon black (C) (N550)[5] | 25 |
| Zinc Oxide | 2.5 |
| Fatty acid[6] | 1.5 |

TABLE 3-continued

| Compound | Parts (phr) |
|---|---|
| Antioxidant(s) | 3.8 |
| Wax, microcrystalline | 1.5 |
| Tackifier resin | 2 |
| Productive Mixing (P) | |
| Sulfur | 2.2 |
| Sulfur cure accelerator(s)[7] | 2 |
| Sulfur cure retarder[8] | 0.2 |

[1]Cis 1,4-polybutadiene, solution polymerization prepared using a titanium based stereospecific catalyst as SKI ™ from Nizhnekamsk
[2]Cis 1,4-polybutadiene, solution polymerization prepared with S$_2$Cl$_2$ mooney-jump technology as CB25 ™ from Lanxess
[3]Composite of cis 1,4-polybutadiene and syndiotactic-1,2-polybutadiene having a melting point of about 200° C., containing 12 or 17 percent of said syndiotactic-1,2-polybutadiene, as VCR412 ™ from UBE or VCR617 ™ from UBE, respectively
[4]Rubber reinforcing carbon black as N134, an ASTM designation, reportedly having an Iodine absorption value (ASTM D1510) of about 142 g/kg.
[5]Carbon black as N550, an ASTM designation, reportedly having an Iodine absorption value (ASTM D1510) of about 43 g/kg and DBP (dibutylphthalate) absorption value (ASTM D2414) of about 121 cc/100 g.
[6]Fatty acid comprised primarily of stearic, palmitic and oleic acids
[7]Sulfur cure accelerator as N-tertbutyl-2benzothiazolesulfenamide
[8]Sulfur cure retarder as N-Cyclohexylthiophthalimide For this evaluation, rubber Samples F through I were evaluated.

Control rubber Sample F was prepared with its elastomer components being a combination of natural rubber and cis 1,4-polyisoprene rubber and a pre-formed masterbatch of cis 1,4-polybutadiene (A) with 12 percent of the syndiotactic-1,2-polybutadiene having a melting point of about 200° C. and diverse rubber reinforcing carbon blacks as N134 and N550. The rubber Sample F contained about 4.2 weight percent of the syndiotactic-1,2-polybutadiene.

Experimental rubber Sample G was prepared with its elastomer components being a combination of natural rubber, cis 1,4-polyisoprene rubber and cis 1,4-polybutadiene rubber (B) with a pre-formed masterbatch of cis 1,4-polybutadiene with 12 percent of the syndiotactic-1,2-polybutadiene having a melting point of about 200° C. and diverse rubber reinforcing carbon blacks as N134 and N550. The rubber Sample F contained about 4.2 weight percent of the syndiotactic-1,2-polybutadiene.

Control rubber Sample H was prepared with their elastomer components being a combination of natural rubber, cis 1,4-polyisoprene rubber, cis 1,4-polybutadiene rubber (A) and a pre-formed masterbatch of cis 1,4-polybutadiene with about 17 percent of the syndiotactic-1,2-polybutadiene having a melting point of about 130° C. and diverse rubber reinforcing carbon blacks as N134 and N550. The rubber Sample F contained about 5.95 weight percent of the syndiotactic-1,2-polybutadiene.

Experimental rubber Sample I was similar to rubber Sample H except that a different ratio of the diverse rubber reinforcing carbon blacks was used.

The rubber compositions were prepared by blending the ingredients in an internal rubber mixer in a series of sequential mixing steps while sheeting out the rubber mixtures and cooling to a temperature below 40° C. between mixing steps. The sequential mixing steps were comprised of a non-productive mixing step(s), (NP), followed by a productive mixing step (P), (in which sulfur and sulfur cure accelerators and optionally retarder were added).

Such sequential mixing steps are well known to those having skill in such art.

The following Table 4 reports cure behavior and various physical properties of rubber Samples A through E based upon the formulation of Table 1. The rubber samples were sulfur cured, where appropriate, for about 11 minutes at about 170° C.

TABLE 4

| | Parts (phr) Rubber Samples | | | |
|---|---|---|---|---|
| | F | G | H | I |
| Elastomers | | | | |
| Natural cis 1,4-polyisoporene rubber | 35 | 35 | 35 | 35 |
| Cis 1,4-polybutadiene rubber (A) | 30 | 30 | 30 | 30 |
| Cis-1,4-polybutadiene rubber (B) | 0 | 30.8 | 0 | 29.05 |
| Syndiotactic-1,2-polybutadiene rubber | 0 | 4.2 | 0 | 5.95 |
| Masterbatch of cis 1,4-polybutadiene containing 12 weight percent syndiotactic-1,2-polybutadiene | 35 | 0 | 0 | 0 |
| Masterbatch of cis 1,4-polybutadiene containing 17 weight percent syndiotactic-1,2-polybutadiene | 0 | 0 | 35 | 0 |
| Syndiotactic-1,2-polybutadiene in rubber composition | 4.2 | 4.2 | 5.95 | 5.95 |
| Carbon black (B), (N134) | 30 | 30 | 30 | 30 |
| Carbon black (C), (N550) | 25 | 25 | 25 | 25 |
| Properties | | | | |
| ATS (11 minutes at 170° C.) | | | | |
| Tensile strength (MPa) | 19.4 | 17.1 | 19.3 | 17 |
| Elongation at break (%) | 397 | 382 | 367 | 380 |
| Modulus (ring) | | | | |
| 200%, (MPa) | 9.4 | 8.4 | 10.5 | 8.6 |
| 300% (MPa) | 15.9 | 14.6 | 17.3 | 14.6 |
| Hardness (Shore A) 23° C. | 69.1 | 68.2 | 70.9 | 69 |
| Rebound, Zwick (%) 100° C. | 66 | 68.1 | 64.2 | 66.5 |
| RPA, 100OC, 1 Hertz[6] | | | | |
| Storage modulus (G'), 1% strain, MPa | 2.9 | 2.5 | 3.1 | 2.4 |
| Storage modulus (G'), 10% strain, MPa | 1.8 | 1.6 | 1.9 | 2.4 |
| Tan delta, 10% strain | 0.12 | 0.14 | 0.12 | 0.11 |
| Volume Electrical Resistivity (ohm-cm) | 646 | 596 | 743 | 729 |

From Table 4 it is observed that the Shore A hardness values and electrical resistivity values for the rubber Samples were similar.

From Table 4 it is further observed that for the rebound (100° C.) values (a measure of hysteresis of the rubber composition):

(A) With addition of 4.2 phr of syndiotactic polybutadiene with melting point of 200° C., together with the diverse carbon blacks, a similar, although somewhat higher rebound value of 68.1 was obtained for rubber Sample G where the syndiotactic polybutadiene was added directly to the rubber composition as compared to a rebound value of 66 where the syndiotactic polybutadiene was added as a masterbatch in cis 1,4-polybutadiene.

(B) With addition of 5.95 phr of syndiotactic polybutadiene with melting point of 130° C., together with the diverse carbon blacks, a similar, although somewhat higher rebound value of 66.5 was obtained for rubber Sample I where the syndiotactic polybutadiene was added directly to the rubber composition as compared to a value of 64.2 where the syndiotactic polybutadiene was added as a masterbatch in cis 1,4-polybutadiene.

Therefore, it is observed that where the rubber composition contained the syndiotactic polybutadiene together with the combination of diverse carbon blacks, similar rebound values were obtained (e.g. similar hysteresis values) whether syndiotactic polybutadiene was added directly to the rubber composition or added as a masterbatch.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential tread of a cap/base configuration comprised of an outer tread cap rubber layer and an internal tread rubber layer underlying said outer tread cap rubber layer, wherein said internal tread rubber layer rubber composition is comprised of, based upon parts by weight per 100 parts by weight rubber (phr):
    (A) rubber(s) comprised of:
        (1) about 2 to about 8 phr of syndiotactic-1,2-polybutadiene, and
        (2) from about 92 to about 98 phr of at least one additional elastomer comprised of at least one of polymers and copolymers of at least one of isoprene and 1,3-butadiene and copolymers of styrene and at least one of isoprene and 1,3-butadiene,
    (B) from about 20 to about 70 phr of reinforcing filler consisting of rubber reinforcing carbon blacks comprised of:
        (1) about 10 to about 40 phr of a first rubber reinforcing carbon black having an Iodine absorption value (ASTM D2515) in a range of from about 20 to about 50 g/kg and a dibutylphthalate (DBP) absorption value (ASTM D2414) in a range of from about 60 to about 150 cc/100 g,
        (2) about 10 to about 40 phr of a second rubber reinforcing carbon black having an Iodine absorption value (ASTM D2515) in a range of from about 100 to about 300 g/kg (ASTM D2515) and a dibutylphthalate (DBP) absorption value (ASTM D2414) in a range of from about 95 to about 135 cc/100 g.

2. The tire of claim 1 where the weight ratio of said first carbon black to said second carbon black is in a range of from 1.1/1 to about 4/1.

3. The tire of claim 1 where the weight ratio of said first carbon black to said second carbon black is in a range of from 1.8/1 to about 4/1.

4. The tire of claim 1 wherein said syndiotactic-1,2-polybudiene is provided as a pre-formed masterbatch of polybutadiene rubber containing from about 8 to about 20 weight percent of said syndiotactic-1,2-polybutadiene.

5. The tire of claim 1 wherein said syndiotactic-1,2-polybudiene has a melting point in a range of from about 100° C. to about 170° C.

6. The tire of claim 1 wherein said additional elastomer(s) are at least one of cis 1,4-polyisoprene, polybutadiene, styrene/butadiene and styrene/isoprene/butadiene elastomers.

* * * * *